United States Patent
Bushell et al.

(10) Patent No.: US 7,894,662 B2
(45) Date of Patent: *Feb. 22, 2011

(54) METHOD FOR USING IMAGE DEPTH INFORMATION IN IDENTIFYING ILLUMINATION FIELDS

(75) Inventors: Steven Joseph Bushell, Cranston, RI (US); Richard Mark Friedhoff, New York, NY (US); Bruce Allen Maxwell, Springfield, PA (US)

(73) Assignee: Tandent Vision Science, Inc., San Francisco, CA (US)

( * ) Notice: Subject to any disclaimer, the term of this patent is extended or adjusted under 35 U.S.C. 154(b) by 1169 days.

This patent is subject to a terminal disclaimer.

(21) Appl. No.: 11/546,217

(22) Filed: Oct. 11, 2006

(65) Prior Publication Data

US 2008/0089576 A1    Apr. 17, 2008

(51) Int. Cl.
*G06K 9/00* (2006.01)
(52) U.S. Cl. .................. 382/154; 382/108; 382/155; 382/190; 382/199; 382/274
(58) Field of Classification Search ........... 345/426, 345/619; 356/326, 328; 382/154, 164, 173, 382/199, 224, 260, 274
See application file for complete search history.

(56) References Cited

U.S. PATENT DOCUMENTS

| | | | | |
|---|---|---|---|---|
| 4,613,269 | A | 9/1986 | Wilder et al. | 364/513 |
| 5,506,913 | A | 4/1996 | Ibison et al. | 382/132 |
| 6,384,859 | B1 * | 5/2002 | Matsumoto et al. | 348/43 |
| 6,445,815 | B1 * | 9/2002 | Sato | 382/154 |
| 6,487,322 | B1 | 11/2002 | Bastos et al. | 382/274 |
| 6,614,537 | B1 * | 9/2003 | Yahashi | 356/602 |
| 6,690,466 | B2 * | 2/2004 | Miller et al. | 356/326 |
| 6,788,808 | B1 * | 9/2004 | Van Overveld et al. | 382/154 |
| 6,862,364 | B1 | 3/2005 | Berestov | 382/132 |
| 7,068,840 | B2 * | 6/2006 | Risson | 382/164 |
| 7,184,890 | B2 * | 2/2007 | Boright et al. | 702/3 |
| 7,565,003 | B2 * | 7/2009 | Ashizaki et al. | 382/154 |
| 2001/0045979 | A1 * | 11/2001 | Matsumoto et al. | 348/43 |
| 2003/0113018 | A1 | 6/2003 | Nefian et al. | 382/181 |
| 2006/0018539 | A1 * | 1/2006 | Sato et al. | 382/173 |
| 2006/0029253 | A1 | 2/2006 | Pace | 382/103 |
| 2006/0095207 | A1 * | 5/2006 | Reid | 701/301 |
| 2006/0120593 | A1 * | 6/2006 | Oshino | 382/154 |
| 2006/0177149 | A1 | 8/2006 | Friedhoff et al. | 382/274 |
| 2006/0193509 | A1 * | 8/2006 | Criminisi et al. | 382/154 |
| 2007/0031037 | A1 * | 2/2007 | Blake et al. | 382/173 |

(Continued)

OTHER PUBLICATIONS

Comaniciu et al.:"Mean shift analysis and applications," Computer Vision 1999, The Proceedings of the Seventh IEEE International Conference on, vol. 2, Sep. 20-27, 1999, pp. 1197-1203.

*Primary Examiner*—Gregory M Desire
(74) *Attorney, Agent, or Firm*—Davidson, Davidson & Kappel, LLC; Felix L. D'Arienzo, Jr.

(57) ABSTRACT

In a first exemplary embodiment of the present invention, an automated, computerized method is provided for determining illumination information in an image. According to a feature of the present invention, the method comprises the steps of identifying depth information in the image, identifying spatio-spectral information for the image, as a function of the depth information and utilizing the spatio-spectral information to identify illumination flux in the image.

22 Claims, 14 Drawing Sheets

U.S. PATENT DOCUMENTS

| | | | |
|---|---|---|---|
| 2007/0041664 A1* | 2/2007 | Yamada | 382/299 |
| 2007/0110298 A1* | 5/2007 | Graepel et al. | 382/154 |
| 2007/0132759 A1* | 6/2007 | Mallick et al. | 345/426 |
| 2007/0176940 A1 | 8/2007 | Maxwell et al. | 345/589 |
| 2007/0217682 A1* | 9/2007 | Motomura et al. | 382/190 |
| 2008/0075371 A1* | 3/2008 | Dana et al. | 382/199 |
| 2008/0080852 A1* | 4/2008 | Chen et al. | 396/324 |
| 2008/0089576 A1* | 4/2008 | Bushell et al. | 382/154 |
| 2009/0033755 A1* | 2/2009 | Friedhoff et al. | 348/222.1 |
| 2009/0066786 A1* | 3/2009 | Landa | 348/54 |

* cited by examiner

18

Image File

P(1,1)  P(1,2)  · · ·           · · · P(1,M)
P(2,1)  P(2,2)
P(3,1)  P(3,2)

⋮

P(N,1)  · · ·                · · · P(N,M)

METHOD FOR USING IMAGE DEPTH INFORMATION IN IDENTIFYING ILLUMINATION FIELDS

BACKGROUND OF THE INVENTION

Many significant and commercially important uses of modern computer technology relate to images. These include image processing, image analysis and computer vision applications. A challenge in the utilization of computers to accurately and correctly perform operations relating to images is the development of algorithms that truly reflect and represent physical phenomena occurring in the visual world. For example, the ability of a computer to correctly and accurately distinguish between a shadow and a material object within an image has been a persistent challenge to scientists. Accordingly, there is a persistent need for the development of accurate and correct techniques that can be utilized in the operation of computers relating to images.

SUMMARY OF THE INVENTION

The present invention provides a method and system comprising the use of image depth information, such as is available, for example, from stereo imagery, to improve techniques that accurately and correctly reflect and represent physical phenomena occurring in the visual world.

In a first exemplary embodiment of the present invention, an automated, computerized method is provided for determining illumination information in an image. According to a feature of the present invention, the method comprises the steps of identifying depth information in the image, identifying spatio-spectral information for the image, as a function of the depth information and utilizing the spatio-spectral information to identify illumination flux in the image.

In a second exemplary embodiment of the present invention, an automated, computerized method is provided for determining illumination information in an image. According to a feature of the present invention, the method comprises the steps of identifying depth information in the image, identifying BIDR model information for the image, as a function of the depth information and utilizing the BIDR model information to analyze illumination flux in the image.

In a third exemplary embodiment of the present invention, an automated, computerized method is provided for manipulating an image. According to a feature of the present invention, the method comprises the steps of identifying depth information in the image, identifying illumination information in the image as a function of spatio-spectral information for the image and manipulating the illumination information for the image as a function of the depth information.

In a fourth exemplary embodiment of the present invention, a computer system comprises a CPU and a memory storing image files for a scene. Pursuant to a feature of the present invention, the computer system is arranged and configured to execute a routine to identify depth information in an image of the scene utilizing the image files for the scene, identify spatio-spectral information for the image, as a function of the depth information and utilize the spatio-spectral information to identify illumination flux in the image.

In a fifth exemplary embodiment of the present invention, a computer system comprises a CPU and a memory storing image files for a scene. Pursuant to a feature of the present invention, the computer system is arranged and configured to execute a routine to identify depth information in an image of the scene utilizing the image files for the scene, identify BIDR model information for the image, as a function of the depth information and utilize the BIDR model information to analyze illumination flux in the image.

In a sixth exemplary embodiment of the present invention, a computer system comprises a CPU and a memory storing image files for a scene. Pursuant to a feature of the present invention, the computer system is arranged and configured to execute a routine to identify depth information in an image of the scene utilizing the image files for the scene, identify illumination information in the image as a function of spatio-spectral information for the image and manipulating the illumination information for the image as a function of the depth information.

In accordance with yet further embodiments of the present invention, computer systems are provided, which include one or more computers configured (e.g., programmed) to perform the methods described above. In accordance with other embodiments of the present invention, computer readable media are provided which have stored thereon computer executable process steps operable to control a computer(s) to implement the embodiments described above. The automated, computerized methods can be performed by a digital computer, analog computer, optical sensor, state machine, sequencer or any device or apparatus that can be designed or programmed to carry out the steps of the methods of the present invention.

DETAILED DESCRIPTION OF THE PREFERRED EMBODIMENTS

Figure 1:
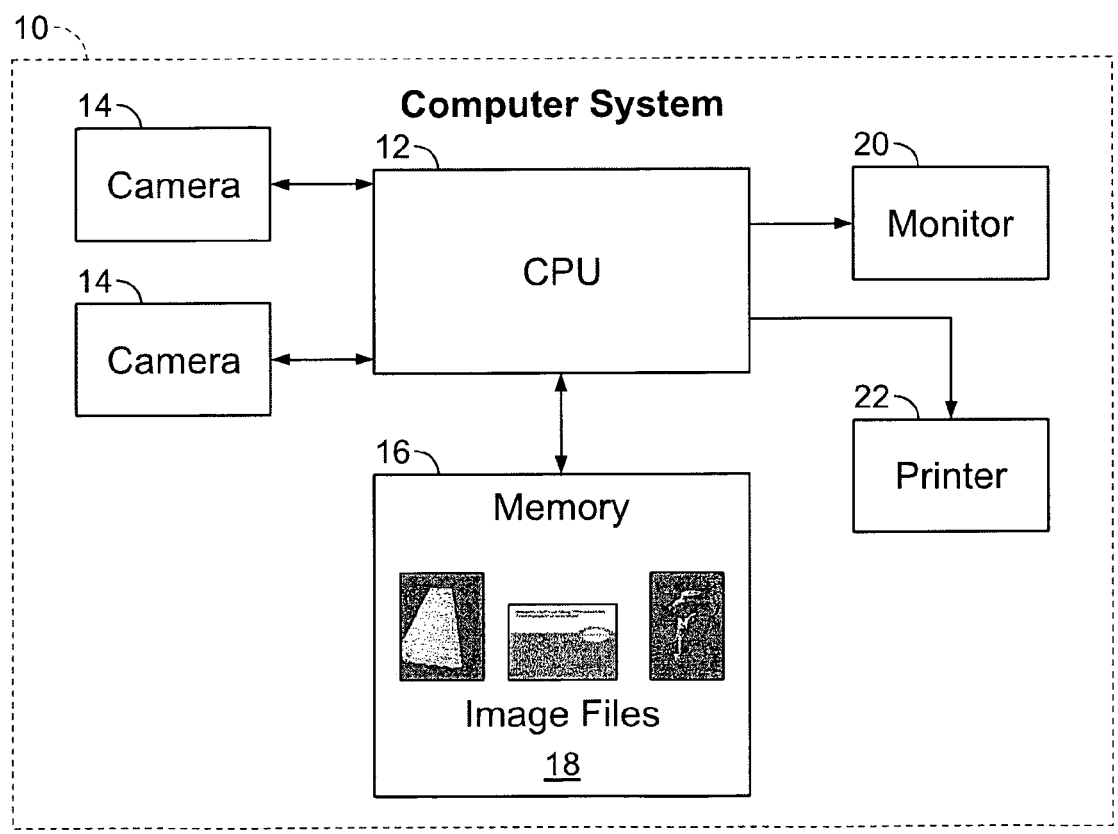
FIG. 1 is a block diagram of a computer system arranged and configured to perform operations related to images, including the recording of stereo images.

Referring now to the drawings, and initially to FIG. 1, there is shown a block diagram of a computer system 10 arranged and configured to perform operations related to images. A CPU 12 is coupled to a device such as, for example, a pair of digital cameras 14 via, for example, a USB port. The digital cameras 14 operate together to record image depth information via a left/right pair of images of a common scene. In this manner, the cameras 14 provide a stereo image of the scene sensed by the cameras 14.

In other embodiments of the present invention, three or more cameras can be used. The cameras 14 can be calibrated by taking simultaneous pictures of the common scene, including a calibration target (for example, a grid of lines) arranged in the scene. Such a calibration picture enables an operator to rectify the images to remove the effects of geometry and distortion, such that the resulting left/right images differ only in the horizontal offsets of individual objects in the scene. Depth information for an image can also be obtained by using a moving video camera or an active range finder plus a calibrated camera. When utilizing a moving video camera, several images of a scene are taken from various points of view, and these images are then used as the left/right pair of images of a common scene obtained via the pair of cameras 14.

In the example of FIG. 1, the stereo left/right pair of images is downloaded to the CPU 12. The CPU 12 stores the downloaded images in a memory 16 as image files 18. The image files 18 can be accessed by the CPU 12 for display, for example, and overlapped to show a three dimensional depiction of the scene, on a monitor 20, or for print out on a printer 22.

Figures 2, 3C:
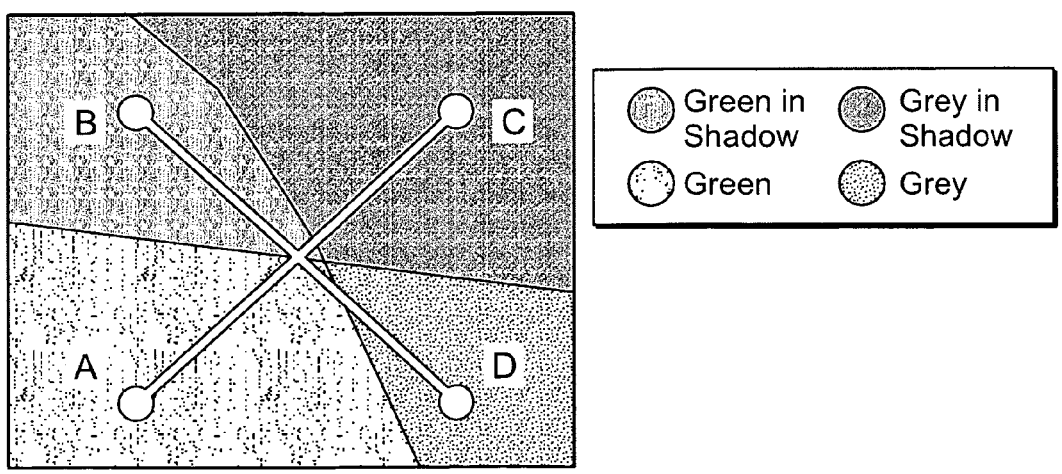
FIG. 2 shows an n×m pixel array image file for an image of a left/right stereo pair of images, as stored in the computer system of FIG. 1.
FIG. 3c shows an image having an X-junction.

As shown in FIG. 2, each image file 18 comprises an n×m pixel array and corresponds to one of a left/right pair of images of a scene recorded by the cameras 14. Each pixel, p, is a picture element corresponding to a discrete portion of the overall image. All of the pixels together define the image represented by the image file 18. Each pixel comprises a digital value corresponding to a set of color bands, for example, red, green and blue color components (RGB) of the picture element. The present invention is applicable to any multi-band image, where each band corresponds to a piece of the electromagnetic spectrum. The pixel array includes m columns of n rows each, starting with the pixel p(1, 1) and ending with the pixel p(n, m). When displaying or printing an image, the CPU 12 retrieves the corresponding image files 18 from the memory 16, and operates the monitor 20 or printer 22, as the case may be, as a function of the digital values of the pixels in each image file 18, as is generally known. The display on the monitor 20 of superimposed left/right images (from corresponding image files 18) provides a stereo display of the scene, as recorded by the cameras 14.

In an image operation, the CPU 12 operates to analyze the RGB values of the pixels of each of a left/right pair of images of a scene to achieve various objectives, such as, for example, the detection and identification of spatio-spectral features of the images. As taught in co-pending application Ser. No. 11/341,742, filed on Jan. 27, 2006, entitled: "Method and System For Identifying Illumination Flux In An Image," now published as U.S. Patent Application Publication No. 2006/0177149 on Aug. 10, 2006, which is hereby incorporated by reference, an image comprises two components, material and illumination. Moreover, as further taught in the co-pending Application, an illumination flux impinging on a material depicted in an image is a bi-illuminant flux which comprises an ambient illuminant and a direct or incident illuminant. The incident illuminant is light that causes a shadow and is found outside a shadow perimeter. The ambient illuminant is light present on both the bright and dark sides of a shadow, but is more perceptible within the dark region of a shadow.

Spectra for the incident illuminant and the ambient illuminant can be different from one another. A spectral shift caused by a shadow, i.e., a decrease of the intensity of the incident illuminant, will be substantially invariant over different materials present in a scene depicted in an image when the scene is illuminated by a common illumination flux. Thus, the spectral shift caused by a shadow can be expressed by a spectral ratio of colors across an illumination boundary defined by a shadow on a material. Inasmuch as an illumination boundary is caused by the interplay between the incident illuminant and the ambient illuminant, spectral ratios throughout the image that are associated with illumination change (illuminant ratios), should be consistently and approximately equal, regardless of the color of the bright side or the material object characteristics of the boundary. A characteristic spectral ratio for a particular image or scene within an image, is a spectral ratio associated with illumination change caused by a shadow, as occurs in the particular image, and can be used to determine if a particular boundary in a scene is caused by a shadow or an object.

To improve the accuracy and correctness of the characteristic ratio for an image, the spectral ratio information for illumination boundaries is determined on a local level, that is, an illuminant ratio is determined for each of several preselected local areas of a scene depicted in an image. An analysis of a boundary is then executed utilizing the spectral ratio for the specific location of the boundary within the image. The determination of locally relevant spectral ratios accommodates complexities that may be encountered in a real world image, for example, the interplay of several different sources of light in a room, inter-reflections, and so on.

As noted above, according to a feature of the present invention, the CPU 12 is operated to identify spatio-spectral features of an image, that is, features that comprise conditions that are indicative of illumination flux. An example of a spatio-spectral feature is an X-junction. An X-junction is an area of an image where a material edge and an illumination boundary cross one another. An X-junction is an optimal location for an accurate determination of an illuminant ratio.

A token analysis of an image is used to identify spatio-spectral features such as X-junctions. A token is a connected region of an image wherein the pixels of the region are related to one another in a manner relevant to identification of spatio-spectral features. The pixels of a token can be related in terms of either homogeneous factors, such as, for example, close correlation of color among the pixels (a uniform token), or nonhomogeneous factors, such as, for example, differing color values related geometrically in a color space such as RGB space (for example, a linear token). The use of tokens rather than individual pixels reduces complexity and noise in image processing and provides a more efficient, less intense computational operation for the computer system 10.

A uniform token analysis is used to identify X-junctions in an image. A uniform token is a homogeneous token that comprises a connected region of an image with approximately constant pixel values (for example, within a range determined by the expected noise margin of the recording equipment or normal variations in materials) throughout the region. A first order uniform token comprises a single robust color measurement among contiguous pixels of the image.

The analysis can include an examination of token neighbor relationships indicative of spatio-spectral features of an image.

Figure 3A:
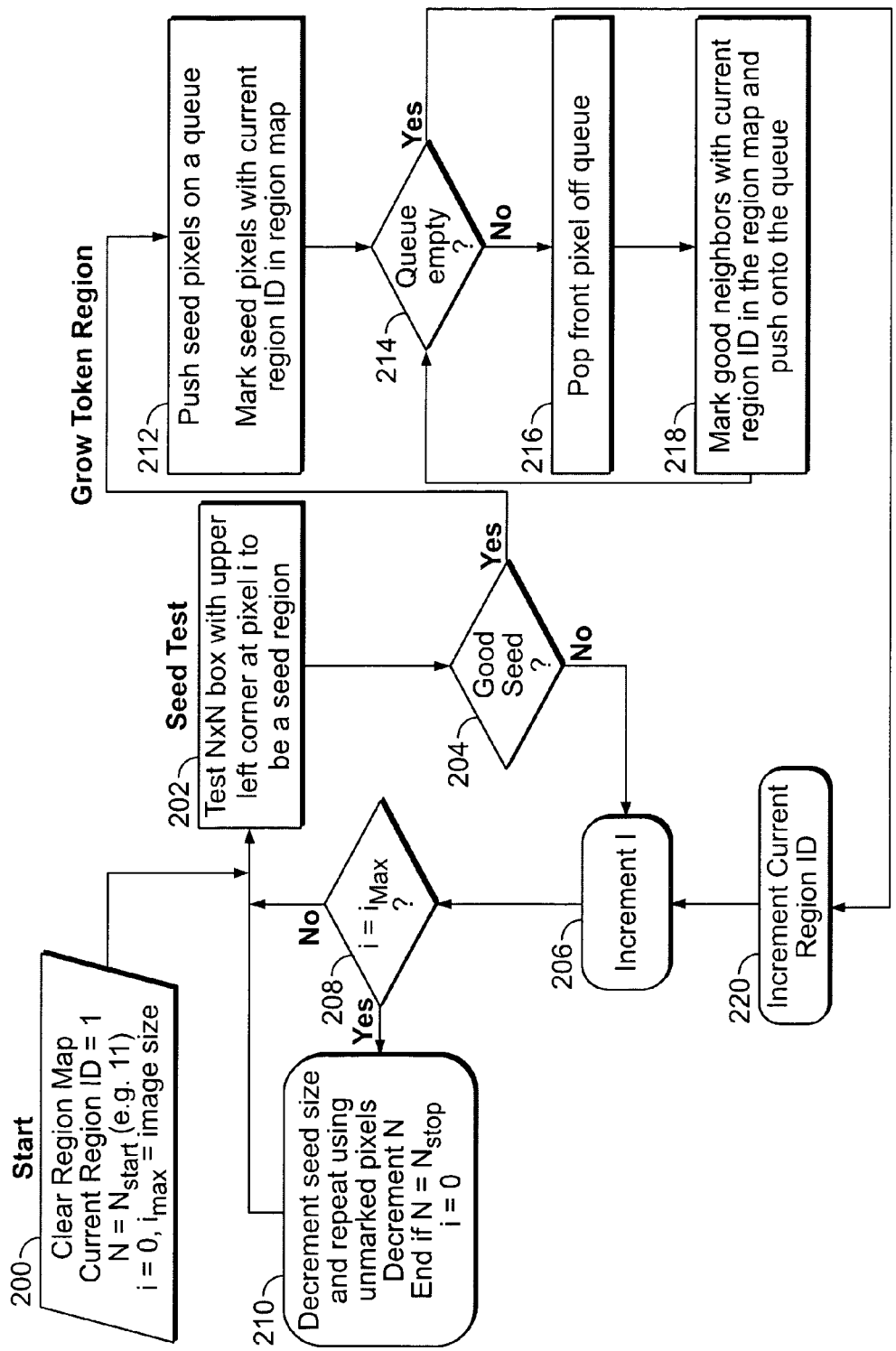
FIG. 3a is a flow chart for identifying token regions in the image file of FIG. 2, according to a feature of the present invention.

FIG. 3a shows a flow chart for identifying token regions in an image depicted in one of a left/right pair of image files 18, according to a feature of the present invention. At the start of the identification routine, the CPU 12 sets up a region map in memory. In step 200, the CPU 12 clears the region map and assigns a region ID, which is initially set at 1. An iteration for the routine, corresponding to a pixel number, is set at i=0, and a number for an N×N pixel array, for use as a seed to determine the token, is set an initial value, $N=N_{start}$. $N_{start}$ can be any integer >0, for example it can be set at set at 11 or 15 pixels.

At step 202, a seed test is begun. The CPU 12 selects a first pixel, i=(1, 1) for example, the pixel at the upper left corner of a first N×N sample. The pixel is then tested in decision block 204 to determine if the selected pixel is part of a good seed. The test can comprise a comparison of the color value of the selected pixel to the color values of a preselected number of its neighboring pixels as the seed, for example, the N×N array. If the comparison does not result in approximately equal values for the pixels in the seed, the CPU 12 increments the value of i (step 206), for example, i=(1, 2), for a next N×N seed sample, and then tests to determine if $i=i_{max}$ (decision block 208).

If the pixel value is at $i_{max}$, a value selected as a threshold for deciding to reduce the seed size for improved results, the seed size, N, is reduced (step 210), for example, from N=15 to N=12. In an exemplary embodiment of the present invention, $i_{max}$ can be set at i=(n, m). In this manner, the routine of FIG. 3a parses the entire image at a first value of N before repeating the routine for a reduced value of N.

After reduction of the seed size, the routine returns to step 202, and continues to test for token seeds. An $N_{stop}$ value (for example, N=2) is also checked in step 210 to determine if the analysis is complete. If the value of N is at $N_{stop}$, the CPU 12 has completed a survey of the image pixel arrays and exits the routine.

If the value of i is less than $i_{max}$, and N is greater than $N_{stop}$, the routine returns to step 202, and continues to test for token seeds.

When a good seed (an N×N array with approximately equal pixel values) is found (block 204), the token is grown from the seed. In step 212, the CPU 12 pushes the pixels from the seed onto a queue. All of the pixels in the queue are marked with the current region ID in the region map. The CPU 12 then inquires as to whether the queue is empty (decision block 214). If the queue is not empty, the routine proceeds to step 216.

In step 216, the CPU 12 pops the front pixel off the queue and proceeds to step 218. In step 218, the CPU 12 marks "good" neighbors around the subject pixel, that is neighbors approximately equal in color value to the subject pixel, with the current region ID. All of the marked good neighbors are placed in the region map and also pushed onto the queue. The CPU then returns to the decision block 214. The routine of steps 214, 216, 218 is repeated until the queue is empty. At that time, all of the pixels forming a token in the current region will have been identified and marked in the region map.

When the queue is empty, the CPU proceeds to step 220. At step 220, the CPU 12 increments the region ID for use with identification of a next token. The CPU 12 then returns to step 206 to repeat the routine in respect of the new current token region. Upon arrival at $N=N_{stop}$, step 110 of the flow chart of FIG. 3a, or completion of a region map that coincides with the image, the routine will have completed the token building task.

Figure 3B:
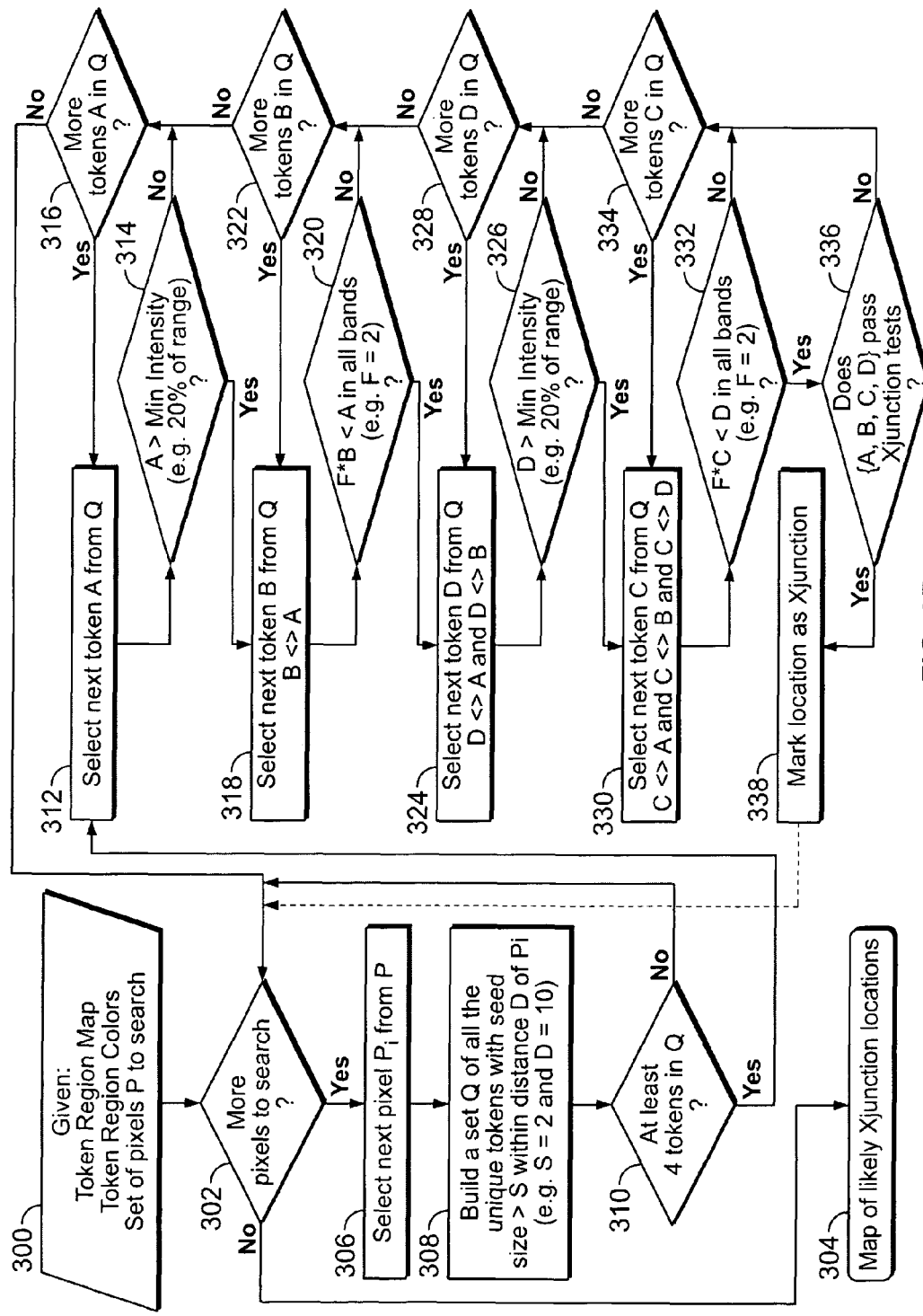
FIG. 3b is a flow chart for identifying X-junctions in an image, using the tokens identified in the flow chart of FIG. 3a, according to a feature of the present invention.

Upon completion of the token region map for the frame, the CPU 12 proceeds to the routine of FIG. 3b, to identify X-junctions in the image of the subject frame using the token region map. In step 300, the CPU 12 is input the token region map completed through execution of the routine of FIG. 3a, the color of each token region and a set of pixels to provide a basis for searching for X-junctions. The pixel set can be a subset of the pixels of the image, for example, selecting every Nth pixel of every Nth row, or jitter sampling, for example selecting a pixel randomly of each N×N box throughout the image. In our examples, N=4.

In a decision block (step 302), the CPU 12 determines whether there are still pixels in the pixel set for search of an X-junction. If no, the CPU 12 exits the routine with a map of likely X-junctions in the frame (step 304). If yes, the CPU 12 proceeds to step 306, to select a next pixel Pi, from the pixel set.

In step 308, the CPU 12 builds a set Q of all unique tokens with a seed size >S within a distance D of the pixel Pi. In our example, S=2 and D=10. In a decision block (step 310), the CPU 12 determines if the set Q has at least four tokens. If no, the CPU 12 returns to the decision block of step 302. If yes, the CPU 12 proceeds to step 312.

In step 312, the CPU 12 selects a token from the set Q to designate as a token A. In a decision block (step 314), the CPU 12 tests the token A to determine whether A>Minimum intensity, for example an intensity equal to 20% of the maximum intensity within the subject frame. If no, the CPU 12 proceeds to a decision block (step 316) to determine whether there are more tokens in the set Q for testing as an A token. If yes, the CPU 12 returns to step 312 to repeat the test. If no, the CPU 12 returns to step 302.

If the CPU 12 determines a yes condition in the decision block of step 314, the CPU 12 proceeds to step 318.

In step 318, the CPU 12 selects a token from the set Q to designate as a token B (with B not equal to A). In a decision block (step 320), the CPU 12 tests the token B to determine whether F*B<A in all color bands. In our example, F=2. If no, the CPU 12 proceeds to a decision block (step 322) to determine whether there are more tokens in the set Q for testing as a B token. If yes, the CPU 12 selects another token and returns to step 318 to repeat the test. If no, the CPU 12 returns to step 316.

If the CPU 12 determines a yes condition in the decision block of step 320, the CPU 12 proceeds to step 324.

In step 324 the CPU 12 selects a token from the set Q to designate as a token D (D not equal to either A or B). In a decision block (step 326), the CPU 12 tests the token D to determine whether D>Minimum intensity, for example an intensity equal to 20% of the maximum intensity within the subject frame. If no, the CPU 12 proceeds to a decision block (step 328) to determine whether there are more tokens in the set Q for testing as an D token. If yes, the CPU 12 selects another token and returns to step 324 to repeat the test. If no, the CPU 12 returns to step 322.

If the CPU 12 determines a yes condition in the decision block of step 326, the CPU 12 proceeds to step 330.

In step 330, the CPU 12 selects a token from the set Q to designate as a token C (C not equal to either A or B or D). In a decision block (step 332), the CPU 12 tests the token C to determine whether F*C<D in all color bands. In our example, F=2. If no, the CPU 12 proceeds to a decision block (step 334) to determine whether there are more tokens in the set Q for testing as a C token. If yes, the CPU 12 selects another token and returns to step 330 to repeat the test. If no, the CPU 12 returns to step 328.

If the CPU 12 determines a yes condition in the decision block of step 332, the CPU 12 proceeds to step 336.

Figure 4:
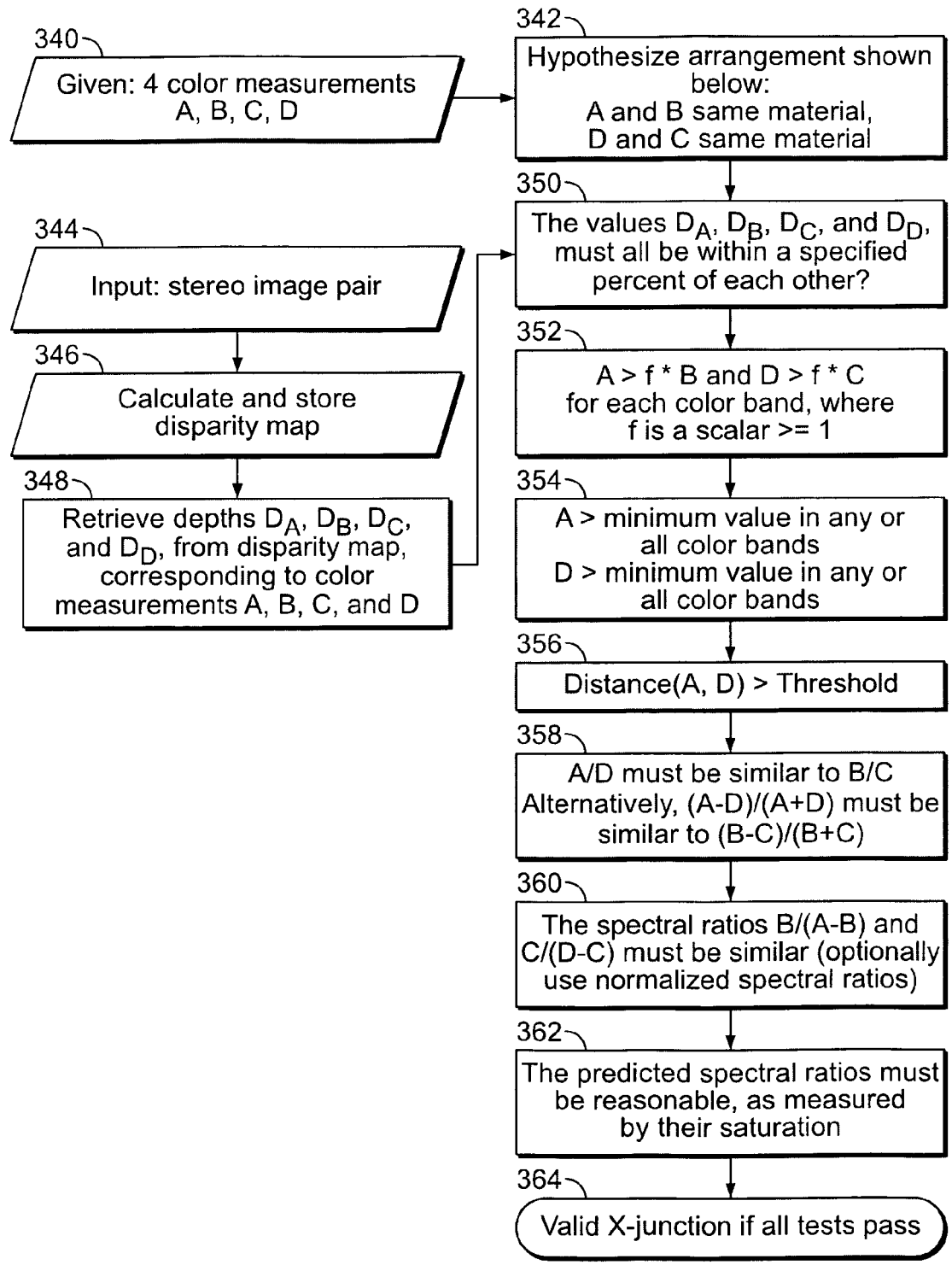
FIG. 4 is a flow chart for improving X-junction tests using a disparity map, according to a feature of the present invention.

Step 336 is an X-junction test, to verify whether the token set {A, B, C, D} identified in the routine of FIG. 3b, is an X-junction. FIG. 4 is a flow chart of a routine for improving X-junction testing in step 336, using a disparity map, according to a feature of the present invention.

In step 340, the token set {A, B, C, D} is input to the CPU 12. In step 342, the CPU 12 adopts the hypothesis of the example of FIG. 3c. FIG. 3c illustrates an image having an x-junction. The hypothesis is that A and B are the same material 1, and that D and C are the same material 2, and that B and C are in shadow.

According to a feature of the present invention, in step 344, the CPU 12 receives as an input the left/right pair of image files 18 related to the image analyzed in the routine of FIG. 3b. In step 346, the CPU 12 uses the left/right pair of image files 18 to calculate and store a disparity map. A disparity map generated as a function of information obtained from the left/right pair of image files 18 provides depth information for the scene depicted in the image files 18.

Disparity between corresponding pixel locations of the left/right pair refers to the relative horizontal displacement of objects in the image. For example, if there were an object in the left image at location (X1, Y), and the same object in the right image at location (X2, Y), then the relative displacement or disparity is the absolute value of (X2−X1). In a known technique, disparity between two pixels, referred to as the correspondence problem, includes the selection of a pixel, and examining a grid of pixels around the selected pixel. For example, a 20×1 pixel grid is compared to the corresponding grid of the other image of the image pair, with the closest match determining an X difference value for the pixel location.

A disparity measure is inversely proportional to the distance of an object from the imaging plane. Nearby objects have a large disparity, while far away or distant objects have a small disparity. The relative depth of an object from the imaging plane, Distance=c/disparity, where c is a constant whose value can be determined for a calibrated pair of cameras 14. In step 348, the CPU 12 utilizes the disparity map for the image pair to calculate the relative depths, $D_A$, $D_B$, $D_C$ and $D_D$, of each token, respectively, of the set {A, B, C, D}. The CPU 12 then proceeds to step 350 to determine whether the values $D_A$, $D_B$, $D_C$ and $D_D$ are within a specified percentage of one another. The percentage can be for example, 10%. Thus, if one object in a prospective X-junction were 72 inches away from the imaging plane, then other objects in the prospective X-junction should be within 7.2 inches of each other.

A consideration of the relative depth of the objects represented by the tokens of the set {A, B, C, D} provides information on the corresponding distances of the materials comprising the prospective X-junction from the imaging plane. Referring once again to the illustration of FIG. 3c, if the materials 1 and 2 are at different depths, then a border in the two dimensional image is a meeting of materials at different locations in the true three dimensional scene recorded in the stereo image pair. Thus, it cannot be certain that the materials are under the same illumination, and truly represent an X-junction. The relative depth information permits the elimination of objects that are subject to different illumination at different depths of the scene, yet form a border in the two dimensional image recorded in the stereo pair.

In step 352, the CPU 12 determines whether the pixels of token A>the pixels of token B and the pixels of token D>the pixels of token C, in each color band. The colors B and C are multiplied by a factor, f, which is a scalar value greater than 1. In step 354, it is determined whether the bright measurements for A and D tokens are brighter than a minimum threshold.

In step 356, the CPU 12 determines whether each of the bright tokens A and D, are significantly different in a color space, for example, in an RGB space. In this regard, a determination is made as to whether the color space distance (A, D)>threshold.

In step 358, the CPU 12 determines whether the reflectance ratio between A and D is approximately equal to the reflectance ratio for B and C. In the alternative, the bounded version of the ratios can be used, $R_1=(A-D)/(A+D)$, and $R_2=(B-C)/(B+C)$, with $R_1=R_2$. In step 360, the spectral ratios $S_1=B/(A-B)$ and $S_2=C/(D-C)$ are compared to determine if they are similar to one another (within a predetermined difference).

In step 362, the CPU 12 determines if the spectral ratios fit an a priori model of a reasonable illuminant. Variations on the constraints can include, for example, requiring the dark measurements for the B and C tokens to be less than a percentage of the corresponding bright measurement. Moreover, the CPU 12 can test the spectral ratios determined in step 338 for saturation levels. Saturation is defined as saturation=1−(minimum color band/maximum color band). An upper boundary can be established for the spectral ratio, in terms of saturation, for example, any spectral ratio with a saturation>0.9 is considered to be unreasonable. If all of the above constraints are met, the X-junction criteria are considered to be satisfied (step 364).

In the event a token set {A, B, C, D} fails the X-junction tests of step 336 FIG. 3b), the CPU 12 returns to step 334. If the token set {A, B, C, D} passes the X-junction tests of step 336, the CPU 12 proceeds to step 338 to mark the token set {A, B, C, D} as a valid X-junction. The CPU 12 then returns to step 302.

Figure 5:
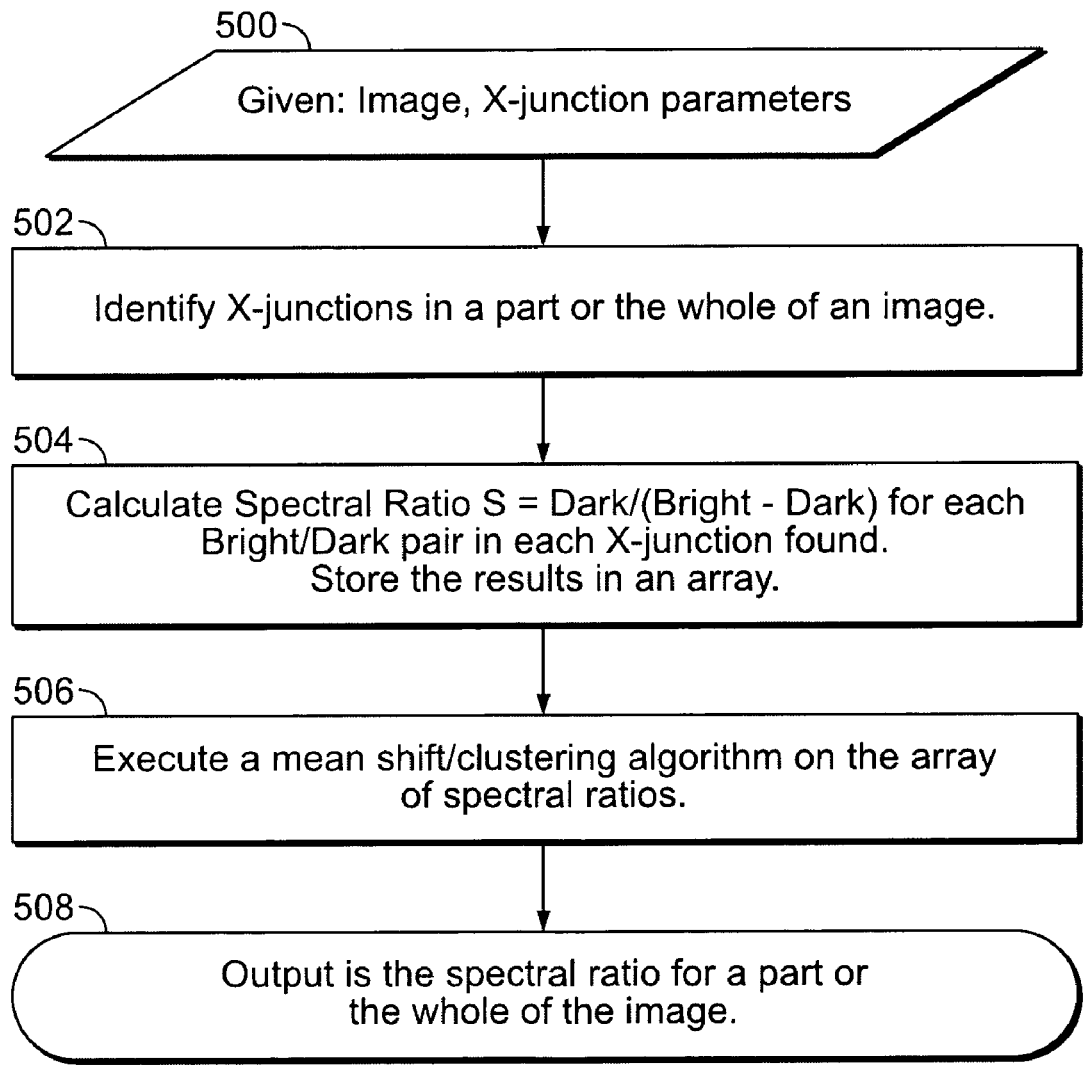
FIG. 5 is a flow chart for identifying a local spectral ratio using an X-junction of the type depicted in FIG. 3c, according to a feature of the present invention.

FIG. 5 is a flow chart for identifying a local characteristic spectral ratio using an X-junction of the type depicted in FIG. 3c, according to a feature of the present invention. The CPU 12 is given an image file 18 of one of a pair of left/right images, and X-junction parameters in step 500. The CPU 12 then proceeds to step 502, which comprises the performance of the processes of FIGS. 3a-c and 4, including the use of relative depth information to verify the spatio-spectral feature determination, throughout the given image to identify all X-junctions within the image.

Upon completion of step 502, the CPU 12 proceeds to step 504 to calculate a spectral ratio for each bright/dark pixel pair in each X-junction, and store the results in a memory array. In step 506, the CPU 12 executes a mean shift algorithm on the array of spectral ratios. The mean shift algorithm can comprise, for example, an algorithm described in "Mean shift analysis and applications," Comaniciu, D.; Meer, P.; Computer Vision, 1999, The Proceedings of the Seventh IEEE International Conference on; Volume 2, 20-27 Sep. 1999; Pages 1197-1203. The output of execution of the mean shift algorithm (step 508) is a spectral ratio for all or a specific local region of the image. The execution of step 506 can include a survey of values for the spectral ratios throughout the image.

If the spectral ratios calculated over the image by, for example, one of the methods described above, vary by an amount>a threshold variance, a local approach will be implemented for the spectral ratio information used in determining illumination boundaries. That is, the value at a specific X-junction, or a mean or median of a set of nearby X-junctions will be used as the spectral ratio when the CPU 12 determines illumination boundaries in the region of the image near the specific X-junction. If all of the spectral ratios for the entire image vary by less than the threshold variance, a global approach can be used with the same mean shift spectral ratio used in all illumination boundary determinations.

Figure 6:
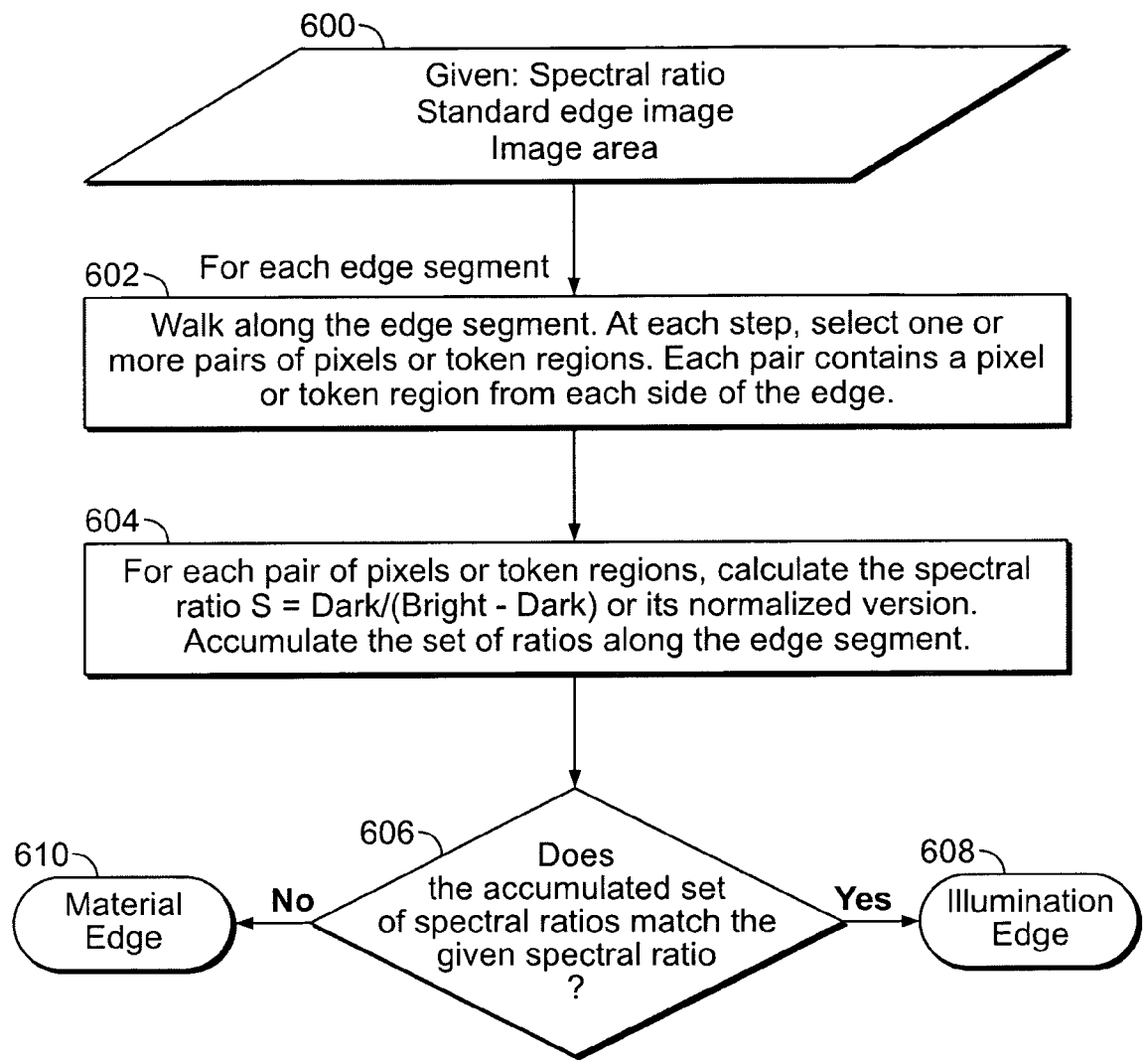
FIG. 6 is a flow chart for identifying material and illumination using ratio matching, according to a feature of the present invention.

As discussed above, the characteristic spectral ratio is used to identify illumination boundaries in an image. FIG. 6 is a flow chart for identifying material and illumination using ratio matching, according to a feature of the present invention. More specifically, the routine of FIG. 6 identifies illumination flux comprising an illumination boundary. In step 600, the CPU 12 is given spectral ratio information for an image determined through execution of the routine of FIG. 5, and standard brightness edge boundary segment information for the image. For each brightness edge segment of the image, in step 602, the CPU 12 traverses the edge by selecting pixel or token pairs, each pair comprising a pixel or token from the bright side of an edge segment and a pixel or token from the dark side of the edge segment.

In step 604, for each pair of pixels or tokens, the CPU 12 calculates a spectral ratio, S=Dark/(Bright−Dark) and accumulates the S values for all the pairs along the corresponding edge segment. In step 606, the CPU 12 decides if the accumulated set of S values for an edge segment matches the given characteristic spectral ratio information. As discussed above, the given spectral ratio information can be a global value for the image or a local value for the part of the image where the edge segment is located. If there is a match of spectral ratios, the CPU 12 marks the edge segment as an illumination boundary (step 608). If there is no match, the CPU 12 marks the edge as a material edge (step 610).

A further use of relative depth information involves an improved method for generating Nth order tokens. An Nth order token is a set of N first order uniform tokens that are different colors, as measured in a selected color space, for example, RGB, hue or chromaticity, and are near to one another in the image. As an example, a red first order token and a blue first order token adjacent to one another in an image could form a second-order token. Nth order tokens are also used to identify local spectral ratios for an image.

Figure 7A:
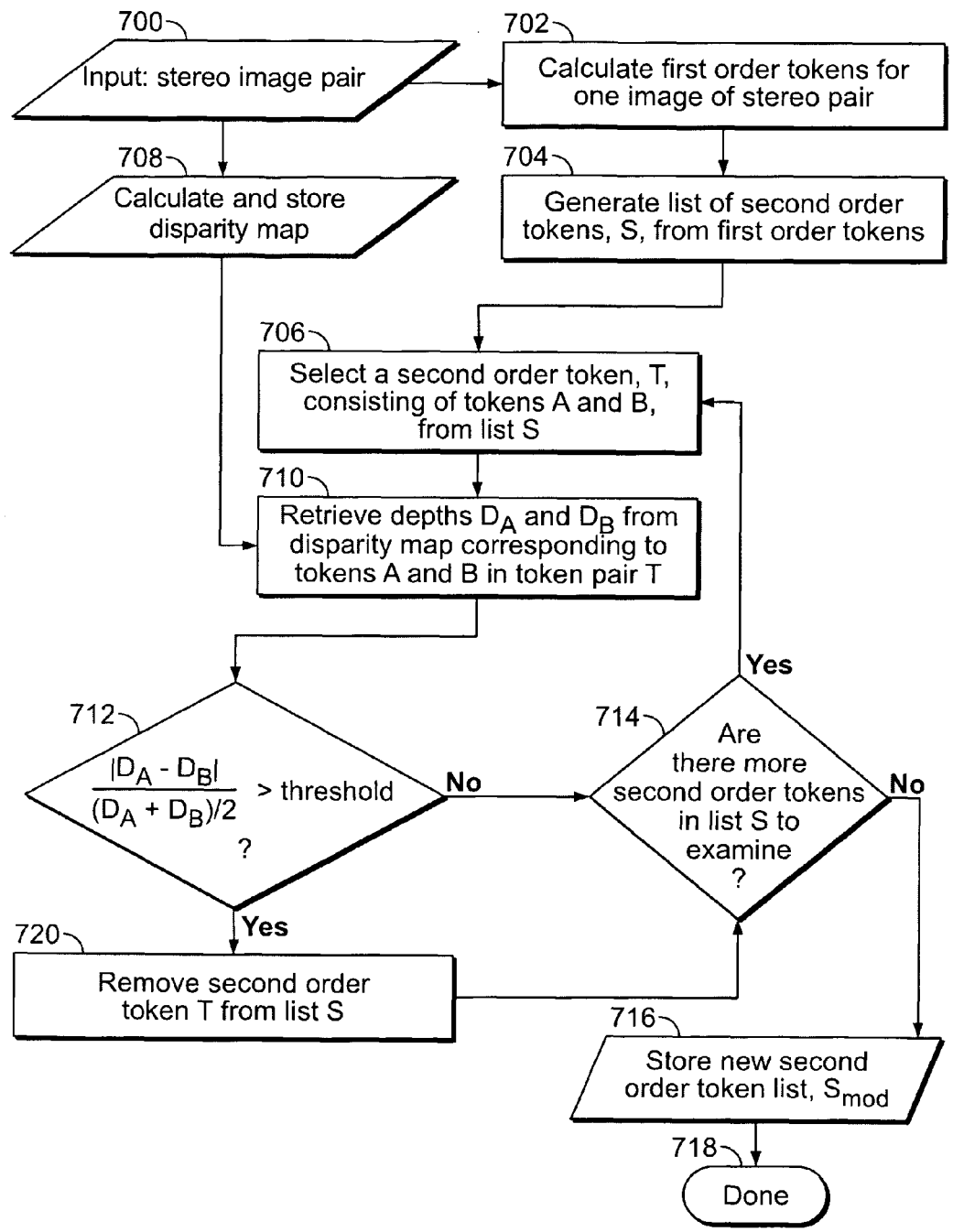
FIG. 7a is a flow chart for improving Nth order token generation using a disparity map, according to a feature of the present invention.

FIG. 7a is a flow chart for improving Nth order token generation using a disparity map, according to a feature of the present invention. In step 700, a stereo image comprising a left/right pair of image files 18 is input to the CPU 12. In step 702, the CPU 12 calculates a list of first order tokens using one of the images of the left/right pair of image files 18. The calculation can be executed as the routine of FIG. 3a, described above. In step 704, the CPU 12 generates a list of Nth order tokens, in our example, a list of second order tokens.

Figure 7B:
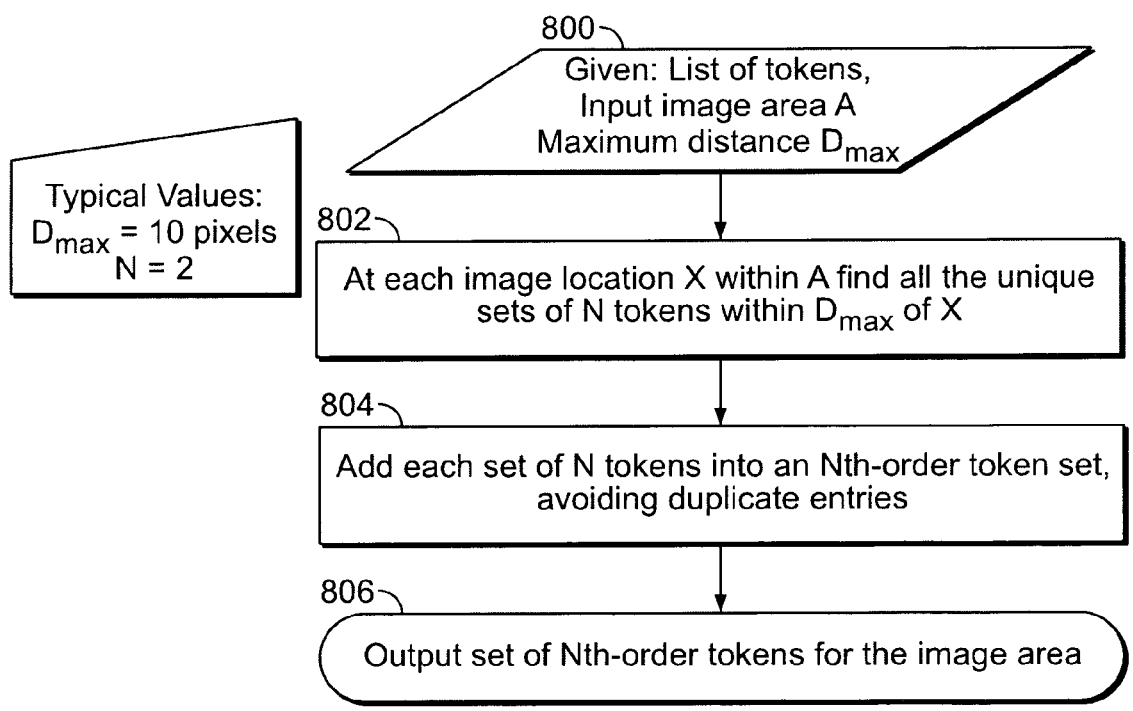
FIG. 7b is a flow chart of a method for creating an Nth order token.

FIG. 7b is a flow chart of a method for creating an Nth order token (step 704 of FIG. 7a). The CPU 12 is given a list of tokens, for example, as identified through execution of the routine of FIG. 3a (step 702), an input image area A (from one of the images of the left/right pair of image files 18) and a maximum distance $D_{max}$, which could be set at 10 pixels (step 800). In step 802, the CPU 12, for each first order token within the image area A, selects an image location or pixel X=p(i,j) and then finds all unique sets of N tokens, that is, for example, all tokens of different color, within $D_{max}$ of each location X. In step 804, the CPU 12 adds each set of N tokens found in step 802, into an Nth order token set, checking for duplicates. In step 806, the CPU 12 outputs the Nth order token sets for the image area as a list, S.

Returning to FIG. 7a, in step 706, the CPU 12 selects a second order token, T, comprising tokens A and B, from the list S of tokens generated in step 704. In a parallel step 708, the CPU 12 calculates and stores a disparity map for the subject stereo image pair, for example, by executing step 346 of the routine of FIG. 4.

In step 710, the CPU 12 calculates the relative depths $D_A$ and $D_B$ of the tokens A and B from the selected second order token T, using the disparity map determined in step 708. The CPU 12 then proceeds to a decision block (step 712).

In the decision block of step 712, the CPU 12 determines whether: $|D_A-D_B|/((D_A+D_B)/2)$>threshold. The threshold can be similar to the threshold value discussed above regarding the relative depths of the X-junction objects, an amount that is reasonable to consider the tokens as at the same depth location relative to the cameras 14.

If no, the CPU 12 proceeds to a decision block (step 714). In the decision block of step 714, the CPU 12 determines whether there are any more second order tokens T in the list S, for examination of relative depth. If no, the CPU 12 proceeds to step 716, to store a new second order token list S, and end the routine (step 718). If yes, the CPU 12 returns to step 706.

If the decision of step 712 is yes (relative depths greater than the threshold), the CPU 12 proceeds to step 720. In step 720, the CPU 12 removes the subject second order token T from the list S, and proceeds to step 714.

Figure 7C:
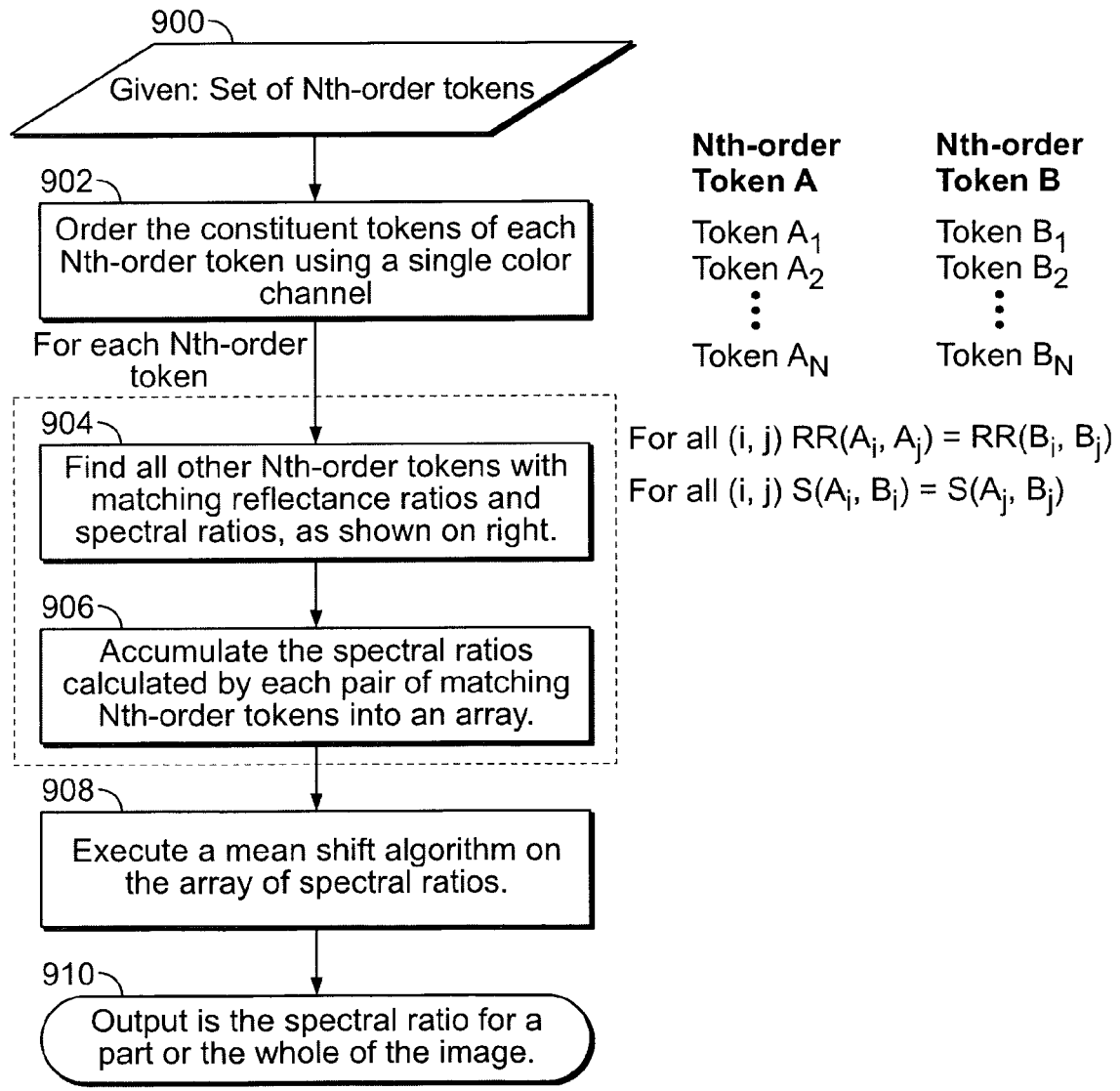
FIG. 7c is a flow chart for identifying a local spectral ratio using Nth order tokens created using the method of FIG. 7b.

FIG. 7c is a flow chart for identifying a local spectral ratio using Nth order tokens created using the method of FIG. 7b. In step 900, a set of Nth order tokens for an image file 18 is given as a start to the CPU 12. The CPU 12 places the uniform tokens within an Nth order token in an order, for example, according to intensity in a single color channel (step 902). As shown in FIG. 7c, adjacent the step 902, a sample order of tokens within each of Nth order token A and Nth order token B is shown. The Nth order token A comprises tokens ordered tokens $A_1, A_2, \ldots A_N$ and Nth order token B comprises ordered tokens $B_1, B_2, \ldots B_N$. Pursuant to a feature of the present invention, for each Nth order token, the CPU 12 operates to find all other Nth order tokens with matching reflectance ratios and spectral ratios (step 904).

Adjacent to step 904 (FIG. 7c) is shown an algorithm for comparing reflectance ratios and spectral ratios for the token pair A, B. For each pair of tokens $A_i, A_j$ in the Nth order token A and a corresponding pair of tokens $B_i, B_j$ in the Nth order token B, the CPU 12 determines equality relationships between the reflectance ratios and spectral ratios for the pairs. The reflectance ratios can be determined using the bounded version of the ratios: $R(A_i,A_j)=(A_i-A_j)/(A_i+A_j)$, and $R(B_i, B_j)=(B_i-B_j)/(B_i+B_j)$, to determine if $R(A_i,A_j)=R(B_i, B_j)$. Similarly, the spectral ratios can be calculated using the preferred form of the spectral ratio: $S(A_i, B_i)$=(Dark one of $(A_i, B_i)$)/Bright one of $(A_i, B_i)$−Dark one of $(A_i, B_i)$), and $S(A_j, B_j)$=(Dark one of $(A_j, B_j)$)/Bright one of $(A_j, B_j)$−Dark one of $(A_j, B_j)$), to determine if $S(A_i, B_i)=S(A_j, B_j)$. The assumption of the analysis and relationship determination is that one of the Nth order tokens is in shadow and the other one of the Nth order tokens is lit.

In step 906, the CPU 12 accumulates all spectral ratios from pairs of Nth order tokens that match, that is, demonstrate equality in step 904 and lists them in an array. The CPU 12 then executes a mean shift algorithm on the array of accumulated spectral ratios (step 908) and outputs the result as a characteristic spectral ratio for a local area or a whole of the image (step 910).

Figure 8A:
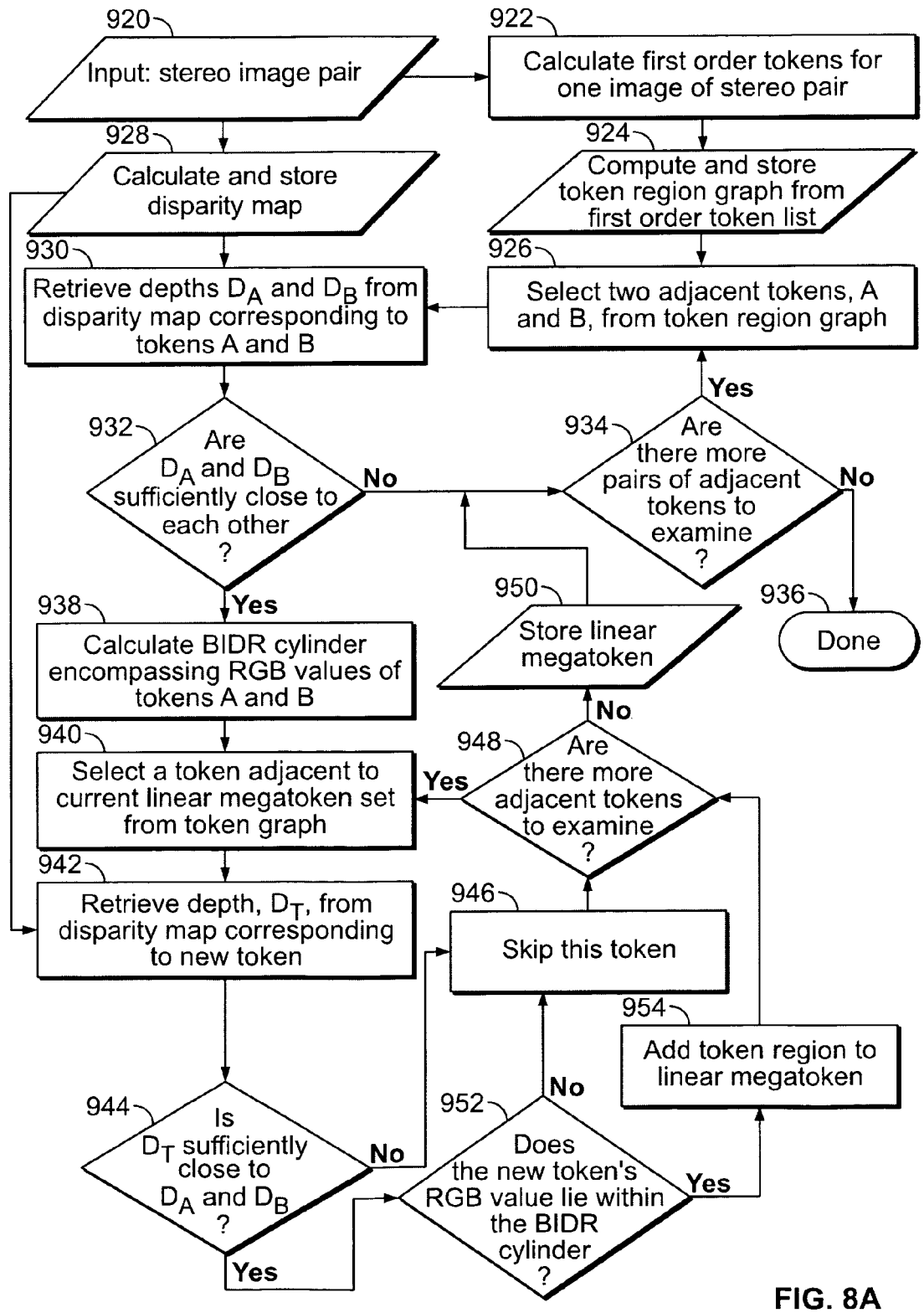
FIG. 8a is a flow chart for improving linear mega-token generation using a disparity map, according to a feature of the present invention.

FIG. 8a is a flow chart for improving linear mega-token generation using a disparity map, according to a feature of the present invention. A linear token is a nonhomogeneous token comprising a connected region of the image wherein adjacent pixels of the region have differing color measurement values that fall within a cylinder in RGB space, from a dark end (in shadow) to a bright end (lit end), along a positive slope. The cylinder configuration is predicted by a bi-illuminant dichromatic reflection model (BIDR model), according to a feature of the present invention, when the color change is due to an illumination change forming a shadow (i.e. a decrease in the intensity of the incident illuminant as the interplay between the incident or direct illuminant and the ambient illuminant in the illumination field) over a single material of a scene depicted in the image. The BIDR model indicates the appearance of a material surface that interacts with an illumination flux comprising an incident illuminant and an ambient illuminant having different spectra.

For example, the BIDR model predicts that the color of a specific material surface is different in shadow than the color of that same surface when partially or fully lit, due to the differing spectra of the incident illuminant and the ambient illuminant. The BIDR model also predicts that the appearance of a single-color surface under all combinations of the two illuminants (from fully lit to full shadow) is represented by a line in a linear color space, such as, for example, an RGB color space, that is unique for the specific material and the illuminant combination interacting with the material. Due to such factors as the noise of measuring equipment, and variations of surface characteristics of a material, the BIDR representation comprises a cylinder around the predicted line. The cylinder includes a diameter related to the noise and variation factors. A BIDR cylinder can be generated by finding linear tokens in the image, and then utilized to adjust a pixel color value as a function of the BIDR cylinder color values, in a color correct image manipulation, to, for example, remove a shadow. For a more detailed description of the BIDR model, reference should be made to application Ser. No. 11/341,751, filed Jan. 27, 2006, entitled: "Bi-illuminant Dichromatic Reflection Model For Image Manipulation," now published as US 2007/0176940 on Aug. 2, 2007, which is hereby incorporated by reference.

In step 920, the CPU 12 receives as an input a pair of left/right image files 18. In step 922, the CPU 12 calculates first order tokens in one of the image files, through execution of the routine of FIG. 3a, to provide a list of first order tokens.

Figure 8B:
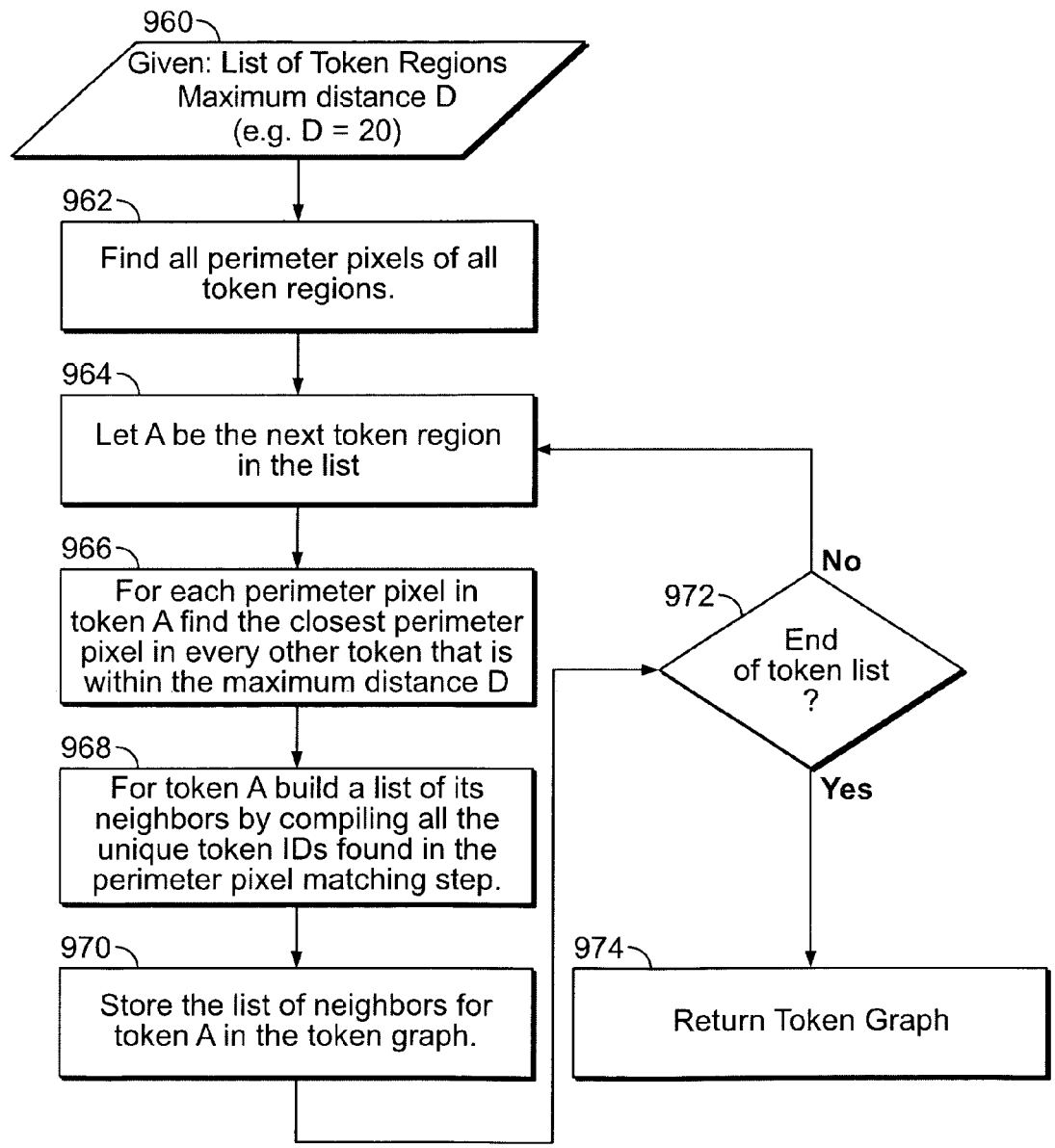
FIG. 8b is a flow chart for building a token region graph from the token regions identified in FIG. 3a, according to a feature of the present invention.

In step 924, the CPU 12 computes and stores a token region graph from the token order list. FIG. 8b shows a flow chart for building a token region graph from the token regions identified through execution of the routine of FIG. 3a, according to a feature of the present invention. Initially, the CPU 12 is given the list of tokens identified in the previous routine, and a value for a maximum distance D between tokens (step 960). In an exemplary embodiment of the present invention, D=20 pixels. In step 962, the CPU 12 traverses pixel information for each token to identify all perimeter pixels of all tokens. The CPU then proceeds to step 964.

In step 964, the CPU 12 selects a token region from the token list and identifies the selected token, for purposes of the routine, as a current token, A. For each perimeter pixel in token A, the CPU 12 finds the closest perimeter pixel in every other token within the maximum distance D from the perimeter of the token A (step 966).

In step 968, the CPU 12 builds a list of tokens that are neighbors to token A by compiling all token IDs found in the previous pixel matching step 966. In step 970, the CPU 12 stores the list of neighbors for token A, and proceeds to decision block 972. In the decision block 972, the CPU 12 checks whether it is at the end of the token list. If not, the CPU 12 returns to step 964, and sets token A to a next token on the token list, and repeats steps 966-972 for the next token. If the CPU 12 is at the end of the token list, the CPU proceeds to step 974, where the CPU 12 returns the token graph for the image.

Upon completion of the routine of FIG. 8b, the CPU 12 proceeds to step 926 of FIG. 8a. In step 926, the CPU 12 selects two adjacent tokens, A and B, form the token graph. In a parallel step 928, the CPU 12 calculates and stores a disparity map for the subject stereo image pair, for example, by executing step 346 of the routine of FIG. 4. In step 930, the CPU 12 determines the depths $D_A$ and $D_B$, for the tokens A and B, using the disparity map, as described above, and proceeds to a decision block (step 932).

In step 932, the CPU 12 determines whether depths $D_A$ and $D_B$, are sufficiently close to one another in three dimensional space, to indicate that the materials of tokens A and B are truly adjacent in three dimensional space and subject to the same illumination flux. The determination can be similar to the depth consideration for X-junctions, for example, within a specified percentage of one another in the depth from the imaging plane dimension. The percentage can be for example, 10%.

If the tokens A and B are not sufficiently close to one another, the CPU 12 proceeds to a decision block (step 934). In the decision block of step 934, the CPU 12 determines whether there more pairs of adjacent tokens in the token graph, for examination. If no, the routine is completed (step 936). If yes, the CPU 12 returns to step 926.

If the tokens A and B are sufficiently close to one another, the CPU 12 proceeds to step 938 to calculate a BIDR cylinder in, for example an RGB space, as defined by and encompassing the RGB values of the tokens A and B. The BIDR cylinder is assumed to reflect the condition of a color change due to an illumination change forming a shadow over a single material of a scene depicted in the image. Confirmation is achieved by examining additional adjacent tokens to determine whether they define a linear mega-token (a linear token comprising several adjacent tokens).

To that end, in step 940, the CPU 12 selects from the token graph another token adjacent to the linear mega-token (initially tokens A and B). The CPU 12 then utilizes the disparity map to determine depth $D_T$ of the selected token (step 942). The CPU 12 then proceeds to a decision block (step 944).

In step 944, the CPU 12 determines whether the depth of the newly selected adjacent token is sufficiently close to the tokens A and B, on the same basis as discussed above in respect to step 932.

If the newly selected token is not sufficiently close to the tokens A and B, the CPU 12 proceeds to step 946, to skip that token. From step 946, the CPU 12 proceeds to a decision block (Step 948), to determine whether there are any more adjacent tokens to examine. If no, the CPU 12 proceeds to step 950 to store information identifying the linear mega-token, and returns to step 934 to either end the routine or continue to examination of further A and B tokens. If yes, the CPU 12 returns to step 940.

If the newly selected token is sufficiently close to the tokens A and B, the CPU 12 proceeds to a decision block (step 952). In the decision block of step 952, the CPU 12 determines whether the new tokens RGB values lie within the BIDR cylinder defined by tokens A and B. If no, the CPU 12 returns to step 946 to skip that token. If yes, the CPU 12 proceeds to step 954 to add the new token to the linear mega-token defined by tokens A and B.

Figure 9A:
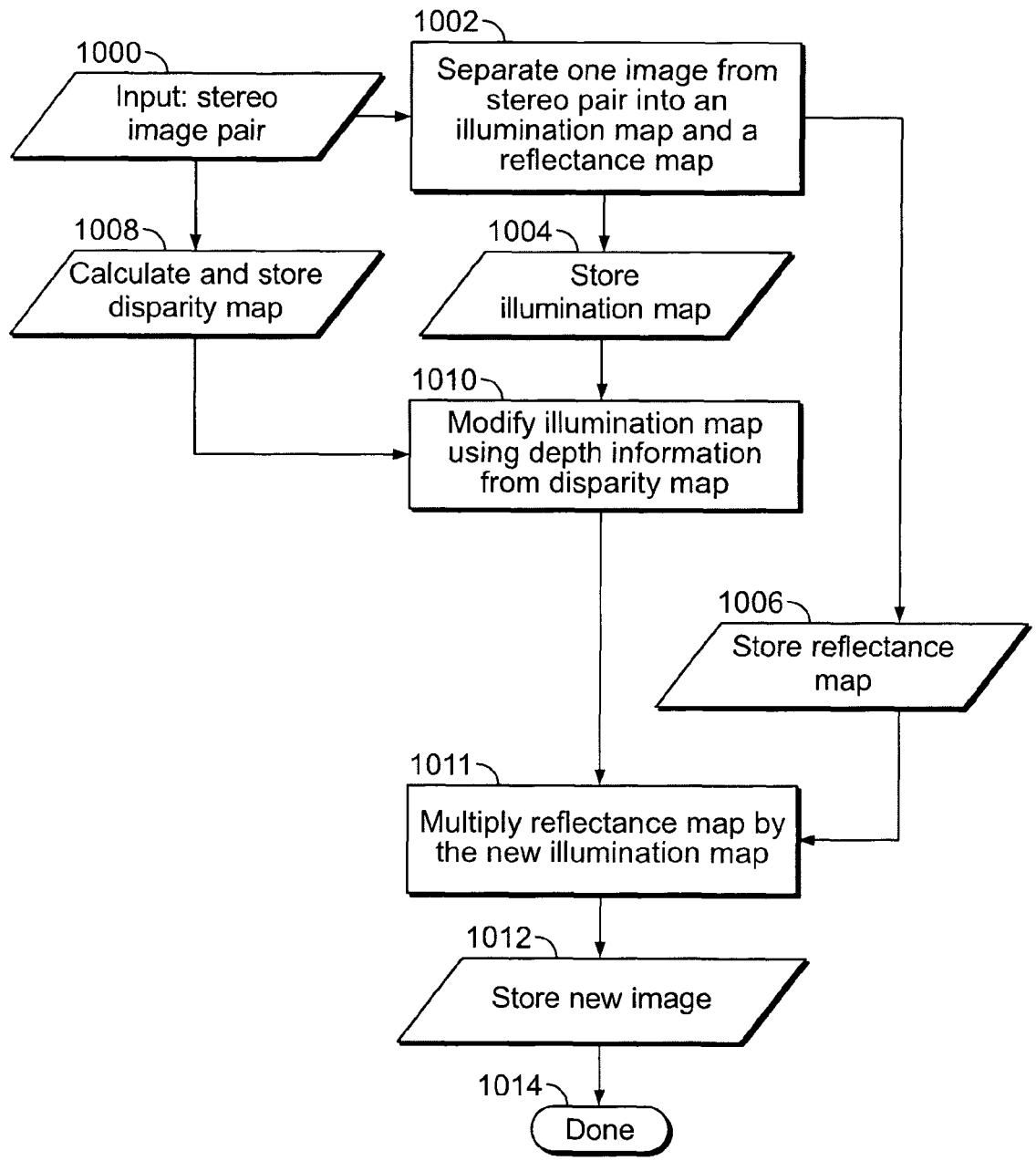
FIG. 9a is a flow chart for improving illumination map modification using a disparity map, according to a feature of the present invention.

Referring now to FIG. 9a, there is shown a flow chart for improving illumination map modification using depth information obtained from, for example, a disparity map, according to a feature of the present invention. A stereo image pair of image files 18 is provided as an input to the CPU 12 (step 1000). In step 1002, the CPU 12 generates and stores an illumination map and a reflectance map of one image from the image pair input.

Figure 9B:
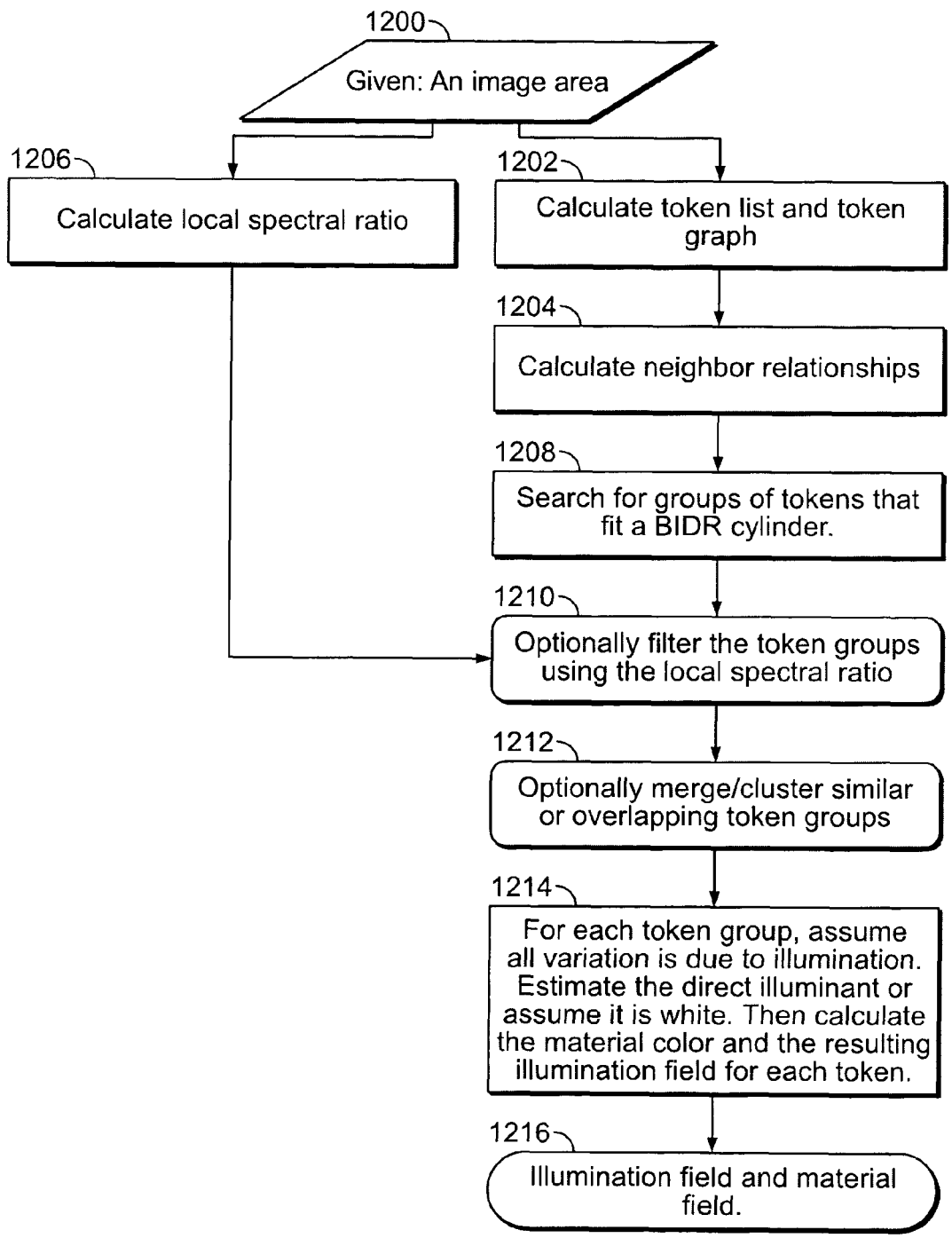
FIG. 9b is a flow chart for identifying illumination and reflectance in an image.

FIG. 9*b* is a flow chart for identifying illumination and reflectance in an image, usable in the performance of step 1002 of FIG. 9*a*. In step 1200, the CPU receives as an input an image area corresponding to the one image from the image pair of step 1002 of FIG. 9*a*. In step 1202, the CPU 12 calculates a token list and token graph. The token list generation can include identification of uniform tokens, as taught in the aforementioned co-pending Application published as U.S. Patent Application Publication No. 2006/0177149.

A token graph is a graph showing neighbor relationships among tokens identified by the CPU 12, for example, all tokens within 20 pixels of a subject token. The graph can be used to identify similar tokens that are neighbors of a subject token, since groups of tokens can extend along the length of a shadow or across an undulating surface. A method for generating a token graph is also disclosed in the co-pending Application published as U.S. Patent Application Publication No. 2006/0177149.

Upon completion of step 1202, the CPU 12 examines all pairs of neighbors in the token graph to evaluate whether the change between the neighboring tokens is caused by an illumination change (step 1204). The examination comprises a set of tests. In a first test, the CPU 12 determines whether one token neighbor is darker than the other in all color bands.

In a second test, the CPU 12 determines whether a line connecting the brighter token color to the darker token color comes close to the origin of the color space depicting the token colors. The CPU 12 evaluates the closeness relationship by calculating the angle between a line connecting the origin with the darker token color value and the line connecting the two token color values. If the angle is greater than a threshold, for example, 10 degrees, the change between the two tokens is deemed to be a material change.

In a third test, the CPU 12 determines whether the reflectance ratio, $R_i=(A_i-B_i)/(A_i+B_i)$ (for a token pair $A_i$ and $B_i$), along pairs of border pixels between two regions, have little variance, and is close to 0 (within noise tolerances).

Upon completion of step 1204, the CPU 12 searches the token list for groups of tokens (step 1208) where neighboring tokens are linked by possible illumination changes, as determined in step 1204, and the color values of the tokens define a cylinder in RGB space (a BIDR cylinder). The groups of tokens can be organized according to the neighbor relationships indicated in the token graph. In parallel, the CPU 12 can calculate a set of local characteristic spectral ratios for the image (step 1206, see FIG. 7*c*). Inasmuch as an illumination boundary is caused by the interplay between the incident illuminant and the ambient illuminant, as discussed above, spectral ratios throughout the image that are associated with illumination change, should be consistently and approximately equal, regardless of the color of the bright side or the material characteristics of the boundary. Thus, if a spectral ratio in our analysis of token groups is approximately equal to characteristic spectral ratio for the scene, that is an indication that the changing color values between the tokens are in fact caused by illumination.

As noted above, the spectral ratio is S=Dark/(Bright−Dark). In step 1210, the CPU 12 can calculate a spectral ratio for the pixels of each of the identified token groups. A token group comprises a collection of spatially adjacent tokens which all lie on an RGB cylinder. The Bright and Dark colors for the ratio are the colors of the brightest and darkest token in the token group. If the spectral ratio for the token group is significantly different from the characteristic spectral ratio for the location of the tokens, then the RGB cylinder represented by the token group may not correspond solely to an illumination change, so the group may be rejected.

In step 1212, the CPU 12 optionally clusters and merges similar token groups. For the purpose of clustering, the CPU defines the distance between two tokens as d=Euclidean distance between the slopes of two BIDR cylinders+0.5*(distance from cylinder 1 Bright end pixel to cylinder 2 axis+distance from cylinder 1 Dark end pixel to cylinder 2 axis+distance from cylinder 2 Bright end pixel to cylinder 1 axis+distance from cylinder 2 Dark end pixel to cylinder 1 axis)+0.5*(|cylinder 1 bright location−cylinder 2 bright location|+|cylinder 1 dark location+cylinder 2 dark location|. The CPU 12 then executes one of any clustering algorithms well-known in the art such as leader-follower (online) clustering or hierarchical agglomerative clustering or a combination of any such methods. The goal of the clustering is to group very similar tokens together, so the maximum allowable distance between any two tokens within a cluster is set at a small threshold.

The results of the clustering are sets or classes of token groups organized such that there is a high degree of similarity between all tokens within each class and that the token groups each represent a single material under varying illumination. All tokens found in a specific group as a result of the clustering should represent the same color transition, for example ambient light to 50% incident illumination on a green surface.

In step 1214, for each token group determined via the clustering of step 1212, the CPU 12 assumes that the tokens represent illumination change in an image for a single material, as predicted by the BIDR model. The CPU 12 estimates the incident or direct illuminant, or assumes the direct illuminant to be white. An estimate of the incident illuminant can be obtained through a white balance algorithm, as typically built into present day, commercially available cameras. Assuming a white incident illuminant, the spectrum will be uniform (1, 1, 1). The CPU 12 can then calculate the material color for the object indicated by the pixels within a group of tokens.

Material color, illuminant and pixel image values are related as follows: Image value=material color*illuminant. Thus pixels in a token group (the token group being a representation of a shadow across a single material, according to the BIDR model of the present invention), provide a basis for correct color determination of a region of consistent reflectance, as exhibited by a single material in the image. An output (step 1216) by the CPU 12 is an indication of a material field identified through an analysis of the identified token groups.

Upon completion of step 1002 (FIG. 9*a*), the CPU 12 stores each of the illumination map (step 1004) and reflectance map (step 1006) derived from the subject image through execution of the routine of FIG. 9*b*.

In a parallel operation, the CPU 12 derives and stores a disparity map for the left/right pair of image files 18, as described above (step 1008). Each of the disparity map and illumination map are input to the CPU 12 for modification of the illumination map (step 1010). The illumination map is modified by applying a known blurring algorithm. When each point in the illumination map is blurred, pixel values in different planes, as indicted by the disparity map, are not used to calculate a central blur value. The elimination of pixels not in the same plane as those used to calculate a blur value minimizes smudging in the resulting modified illumination map.

In step 1011, the CPU 12 multiplies the modified illumination map by the stored reflectance map, and stores the new image (step 1012). The routine is then complete (step 1014).

In the preceding specification, the invention has been described with reference to specific exemplary embodiments and examples thereof. It will, however, be evident that various modifications and changes may be made thereto without departing from the broader spirit and scope of the invention as set forth in the claims that follow. The specification and drawings are accordingly to be regarded in an illustrative manner rather than a restrictive sense.

What is claimed is:

1. An automated, computerized method for determining illumination information in an image, comprising the steps of:
a computer executing the following steps:
identifying depth information in the image;
identifying spatio-spectral information for the image, as a function of the depth information; and
utilizing the spatio-spectral information to identify illumination flux in the image.

2. The method of claim 1 wherein the step of identifying depth information in the image is carried out by recording a stereo image.

3. The method of claim 2 comprising the further step of utilizing the stereo image to calculate a disparity map.

4. The method of claim 3 wherein the step of identifying spatio-spectral information for the image, as a function of the depth information, is carried out as a function of the disparity map.

5. The method of claim 1 wherein the step of identifying depth information in the image is carried out by recording a plurality of images utilizing a moving video camera.

6. The method of claim 1 wherein the spatio-spectral information comprises an X-junction.

7. The method of claim 1 wherein the spatio-spectral information comprises an Nth order token.

8. The method of claim 1 wherein the spatio-spectral information comprises a linear token.

9. An automated, computerized method for determining illumination information in an image, comprising the steps of:
a computer executing the following steps:
identifying depth information in the image;
identifying BIDR model information for the image, as a function of the depth information; and
utilizing the BIDR model information to analyze illumination flux in the image.

10. The method of claim 9 wherein the BIDR model information comprises a megalinear token.

11. The method of claim 10 comprising the further step of utilizing the mega-linear token to adjust a pixel color value as a function of BIDR model information color values, in a color correct image manipulation.

12. An automated, computerized method for manipulating an image, comprising the steps of:
a computer executing the following steps:
identifying depth information in the image;
identifying illumination information in the image as a function of spatio-spectral information for the image; and
manipulating the illumination information for the image as a function of the depth information.

13. The method of claim 12 wherein the step of identifying illumination information in the image as a function of spatio-spectral information for the image is carried out by separating the image into an illumination map and a reflectance map.

14. A computer system which comprises:
a CPU; and
a memory storing image files for a scene;
the CPU arranged and configured to execute a routine to identify depth information in an image of the scene utilizing the image files for the scene, identify spatio-spectral information for the image, as a function of the depth information and utilize the spatio-spectral information to identify illumination flux in the image.

15. A computer system which comprises:
a CPU; and
a memory storing image files for a scene;
the CPU arranged and configured to execute a routine to identify depth information in an image of the scene utilizing the image files for the scene, identify BIDR model information for the image, as a function of the depth information and utilize the BIDR model information to analyze illumination flux in the image.

16. A computer system which comprises:
a CPU; and
a memory storing image files for a scene;
the CPU arranged and configured to execute a routine to identify depth information in an image of the scene utilizing the image files for the scene, identify illumination information in the image as a function of spatio-spectral information for the image; and
manipulating the illumination information for the image as a function of the depth information.

17. An automated, computerized method for processing an image, comprising the steps of:
a computer executing the following steps:
providing an image file depicting an image, in a computer memory;
identifying illumination and reflectance in the image to provide an illumination map and a reflectance map;
manipulating the illumination map; and
merging the manipulated illumination map and the reflectance map to provide a modified output image.

18. The method of claim 17 wherein the step of manipulating the illumination map is carried out by blurring the illumination map.

19. The method of claim 18 including the further step of deriving a disparity map for the image to provide depth information and carrying out the step of blurring the illumination map as a function of the depth information.

20. A computer program product, disposed on a non-transitory computer readable media, the product including computer executable process steps operable to control a computer to: identify depth information in an image of a scene utilizing image files for the scene, identify spatio-spectral information for the image, as a function of the depth information and utilize the spatio-spectral information to identify illumination flux in the image.

21. A computer program product, disposed on a non-transitory computer readable media, the product including computer executable process steps operable to control a computer to: identify depth information in an image of a scene utilizing image files for the scene, identify BIDR model information for the image, as a function of the depth information and utilize the BIDR model information to analyze illumination flux in the image.

22. A computer program product, disposed on a non-transitory computer readable media, the product including computer executable process steps operable to control a computer to: provide an image file depicting an image, in a computer memory, identify illumination and reflectance in the image to provide an illumination map and a reflectance map, manipulate the illumination map and merge the manipulated illumination map and the reflectance map to provide a modified output image.

* * * * *